United States Patent [19]

Chase et al.

[11] Patent Number: 5,166,818
[45] Date of Patent: Nov. 24, 1992

[54] OPTICAL PULSE-SHAPING DEVICE AND METHOD, AND OPTICAL COMMUNICATIONS STATION AND METHOD

[75] Inventors: Eugene W. Chase; Peter J. Delfyett, Jr., both of Middletown; Jonathan P. Heritage, Tinton Falls; Robert N. Thurston, Colts Neck, all of N.J.

[73] Assignee: Bell Communications Research, Inc., Livingston, N.J.

[21] Appl. No.: 667,033

[22] Filed: Mar. 11, 1991

[51] Int. Cl.$^5$ .................. G02B 5/18; G02B 7/185; H01S 3/08
[52] U.S. Cl. .................. 359/170; 359/572; 359/615; 359/868; 372/102; 372/700
[58] Field of Search .............. 350/3.65, 162.23, 168, 350/611; 370/3; 372/102, 700; 455/617; 359/8, 572, 574, 868, 869, 566, 615, 154, 170

[56] References Cited

U.S. PATENT DOCUMENTS

| | | | |
|---|---|---|---|
| 3,521,943 | 7/1970 | Keiderman | 359/868 |
| 4,003,640 | 1/1977 | Hansen | 350/611 |
| 4,229,710 | 10/1980 | Shoshan | 372/102 |
| 4,239,343 | 12/1980 | Wrench | 350/611 |
| 4,295,710 | 10/1981 | Heinz | 350/611 |
| 4,355,350 | 10/1982 | Mader | 359/869 |
| 4,492,431 | 1/1985 | Eitel et al. | 350/611 |
| 4,655,547 | 4/1987 | Heritage et al. | |
| 4,752,130 | 6/1988 | George et al. | 372/102 |
| 4,829,527 | 5/1989 | Wortman et al. | 372/102 |
| 4,834,474 | 5/1989 | George et al. | 372/102 |
| 4,866,699 | 9/1989 | Brackett et al. | 370/3 |
| 4,868,834 | 9/1989 | Fox et al. | 372/102 |

Primary Examiner—Martin Lerner
Attorney, Agent, or Firm—Leonard Charles Suchyta; Charles S. Guenzer

[57] ABSTRACT

For use, e.g., in the compensation of frequency dispersion in the course of transmission of an optical signal, a pulse-shaping device is provided with a suitably shaped nonplanar mirror (16). When spatially spread-out frequency components—produced, e.g., by a grating (14)—are reflected from such mirror, a frequency-dependent phase shift is introduced; for example, such phase shift may be a third-order function of frequency. Upon recombination of frequencies, a shaped pulse is obtained. Furthermore, third-order compensation can be used to compress amplified light pulses, e.g. as produced by a semiconductor gain medium (80, 81).

14 Claims, 5 Drawing Sheets

EXPERIMENTAL OUTPUT

CALCULATED

INPUT 0.6 PSEC/DIV

OUTPUT 0.6 PSEC/DIV

OPTICAL PULSE-SHAPING DEVICE AND METHOD, AND OPTICAL COMMUNICATIONS STATION AND METHOD

TECHNICAL FIELD

The invention is concerned with optical signals and their shape.

BACKGROUND OF THE INVENTION

In optical telecommunications, as well as in other fields where light pulses are used (e.g., in laser fusion), the need for optical pulse shaping is well recognized. For example, in fiber-optical communications, as a pulse tends to be distorted due to dispersion in the course of transmission over an optical fiber, pulse shaping may be used to advantage at a transmitter or at a receiver. Indeed, compensation for optical dispersion is a principal motive for pulse shaping.

Optical dispersion can be understood in terms of frequency-dependent propagation velocities of sinusoidal waveforms constituting a signal. In typical transmission media, dispersion is either directly or indirectly related to frequency, dispersion being termed "normal" in the case of a medium in which higher-frequency waves travel more slowly, and "anomalous" in the opposite case. Typically also, dispersion is nonlinearly related to frequency, so that it is meaningful to consider higher-order terms of a functional relationship between dispersion and frequency, e.g., second- and third-order terms. Higher-order dispersion is particularly significant in the transmission of ultrafast (subpicosecond, terabit) optical signals. Such signals are preferred in so-called code-division multiple-access communications, a field which is under active current development; see, e.g., U.S. Pat. No. 4,866,699, issued Sep. 12, 1989 to C. A. Brackett et al.

One class of pulse-shaping methods and devices, disclosed in U.S. Pat. No. 4,655,547, issued Apr. 7, 1987 to J. P. Heritage et al., is predicated on spatial dispersion of frequency components of a signal, combined with the use of a spatial amplitude and/or phase mask. Motivation for an aspect of the invention described below stems from the desire to provide pulse-shaping means which are particularly easy to implement and which can be fabricated by simple mechanical assembly.

SUMMARY OF THE INVENTION

In accordance with an aspect of the invention, a preferred pulse-shaping device comprises spreader means (e.g., a grating and a lens) for spatially spreading out frequency components of an optical input signal, and reflector means (e.g., a curved mirror) for imparting a frequency-dependent phase shift to spatially spread-out frequency components. A shaped pulse is obtained upon recombination of phase-shifted frequencies, e.g., in an arrangement in which the spreader means serves as its own inverse to spatially recombine the spread-out frequencies. Optionally, by use of a reflector with varying reflectivity, phase shifting can be combined with frequency-dependent amplitude adjustment. In accordance with an embodiment of the invention, preferred pulse shaping can be used for the compensation of nonlinear, e.g. third-order phase dispersion in optical communications.

In accordance with a further aspect of the invention, a frequency-dependent third-order phase shift can serve to compress an optical pulse, e.g., an amplified laser pulse.

DETAILED DESCRIPTION

Figure 1:
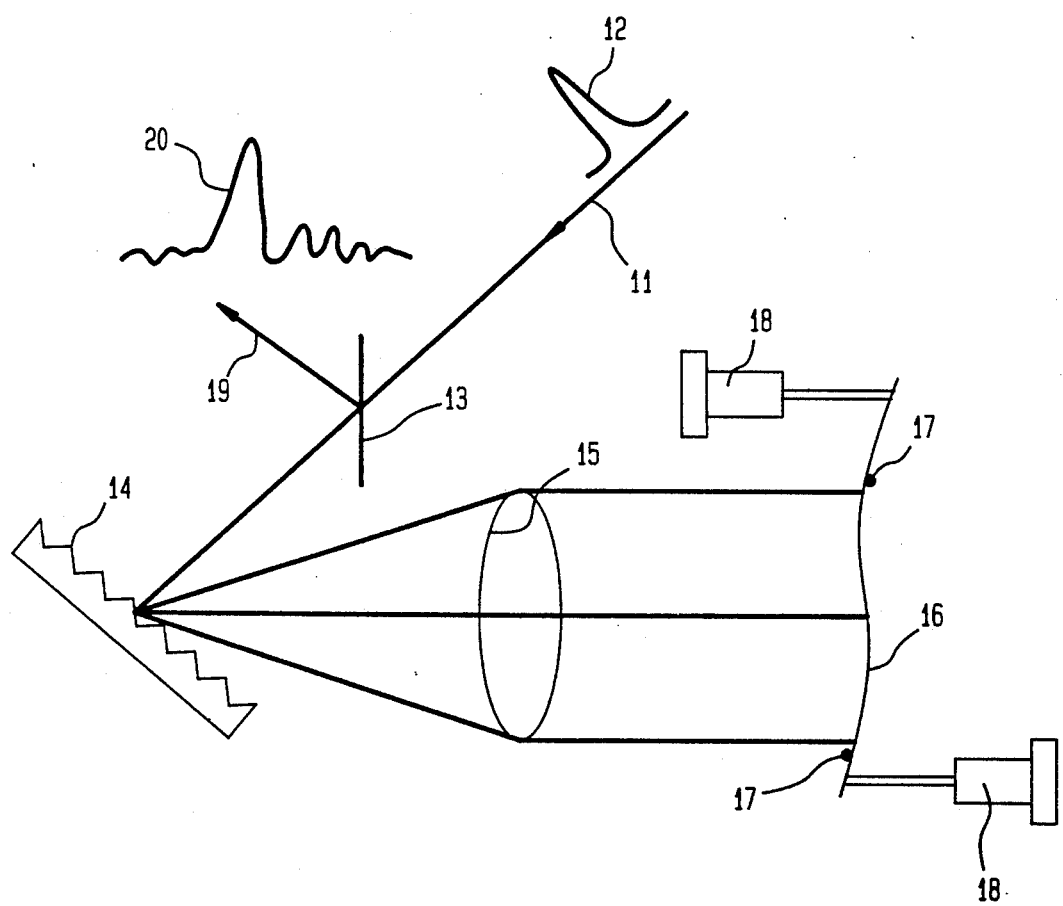
FIG. 1 is a schematic representation of a device or assembly in accordance with a preferred embodiment of the invention, comprising a preferred reflector subassembly which can serve as a phase shifter.

Since, in fiber-optics, there is particular interest in the compensation for third-order or cubic dispersion, a corresponding preferred embodiment of the invention will be described first. In accordance with such embodiment, third-order dispersion is produced (or, conversely, compensated for) by an arrangement according to FIG. 1 which shows input beam 11 carrying pulse 12, beam splitter 13, grating 14 for spatially spreading out frequency components of pulse 12, lens 15, mirror 16, mirror supports 17, and micrometer pushers 18 for applying pressure in opposite directions at two points an equal distance away from supports 17. Instead of a reflection grating as shown, a transmission grating or a prism can be used.

As a result of pressure applied by pushers 18, mirror 16 is elastically deformed, and optical frequency components are reflected by mirror 16 with a frequency-dependent phase shift. In accordance with an aspect of the invention, for a homogeneous, constant-thickness, initially flat mirror, for pusher forces essentially equal in magnitude, and for essentially frictionless physical contact between mirror 16 and contacts and pushers 17 and 18, such phase shift is a cubic function of frequency. (Friction may be minimized by the use of ball bearings and of low-friction materials, e.g. Teflon.) Cubic dependence of the phase shift as a function of frequency is under the assumption of linearly spread-out frequency components and follows from the fact that the illustrated torquing of mirror 16 produces a displacement which, except for a possible linear term, varies cubically along its length. Preferably, as shown, after reflection from mirror 16, light is focused by lens 15 back onto grating 14, and an output beam 19 is produced which carries shaped pulse 20.

Preferably, for purely third-order compensation, light incidence on mirror 16 is such that the center of the beam falls on the inflection point of mirror 16, with essentially perpendicular incidence at that point. Oblique incidence gives rise to a superimposed linear shift which, however, does not affect the shape of a reflected signal. If incidence is off-center, a second-order shift is introduced—as may be used intentionally to compensate for second-order frequency dispersion in an input signal. The sign or direction of dispersion can be changed either by reversal of the spectrum produced by grating 14 or else by reversing the shape of mirror 16.

Preferably, the distances between grating 14 and lens 5, and between lens 15 and mirror 16 are at least approximately equal to the focal length of lens 15—this in the interest of preferred mutual cancellation of frequency dispersions introduced by the grating and by the lens. However, such and other frequency dispersions may also be compensated for by suitable mirror adjustment, and this applies also to the compensation for any nonlinearity in the spread-out frequency spectrum.

In an experimental device, designed for a wavelength of 1.54 micrometer, grating 14 had a grating constant of 600 lines per millimeter, lens 15 had a focal length of 50 centimeters, and mirror 16 consisted of a gold-coated fused silica body 120 millimeters long, 10 millimeters wide, and 1 millimeter thick. Mirror supports 17 were spaced 64 millimeters apart, and micrometer pushers 18 were adjusted each to produce a deflection of 100 micrometers at points 23 millimeters from mirror supports 17.

Figure 2:
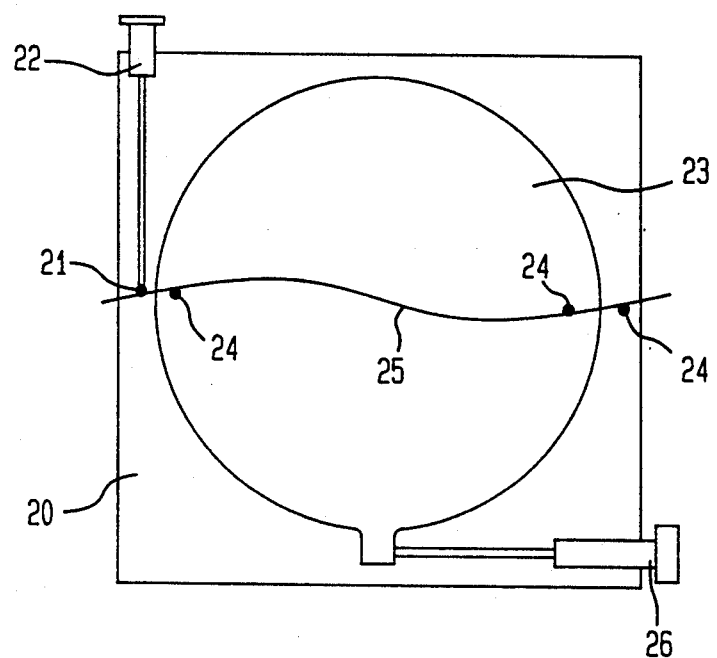
FIG. 2 is a schematic representation of an alternative embodiment of a reflector subassembly for inclusion in a further preferred embodiment of the invention.

An alternative preferred arrangement for mirror deformation is depicted in FIG. 2 which shows stage 20 with support assembly 21 and 22, 21 being a pivot and 22 in the form of a micrometer pusher. Shown further are turntable 23 with low-friction supports 24, mirror 25, and second micrometer pusher 26. Supports 21 and 24 may take the form of pins or rods. Micrometer pusher 22 can be used for initial adjustment, after which the shape of mirror 25 can be controlled by micrometer pusher 26. This assembly, too, is effective as a third-order reflector element.

While, as described with reference to FIG. 1 and 2, third-order dispersion is conveniently produced or compensated for by a device including an elastically deformed constant-thickness, homogeneous reflector element, the use of reflector elements having nonconstant thickness and/or nonhomogeneous composition is not precluded—for quadratic, cubic, or even higher-order dispersion or dispersion compensation. This may involve the inclusion of additional push- or pull-controllers, possibly with mirror attachments for pulling at points on the backside of a mirror. Among further variations are the inclusion of a reflector element having a permanently nonplanar surface as may be produced, e.g., by grinding; the inclusion of reflector surfaces which are stepped, piecewise planar, or planar in part; and the use of reflectors whose surface shape is controlled or influenced by acoustic waves. Furthermore, in integrated optics, a reflector may take the form of an edge of an etched layer, and may be monolithically integrated with an etched lens and an etched grating, and with thin-film waveguides serving as light paths.

Figure 3:
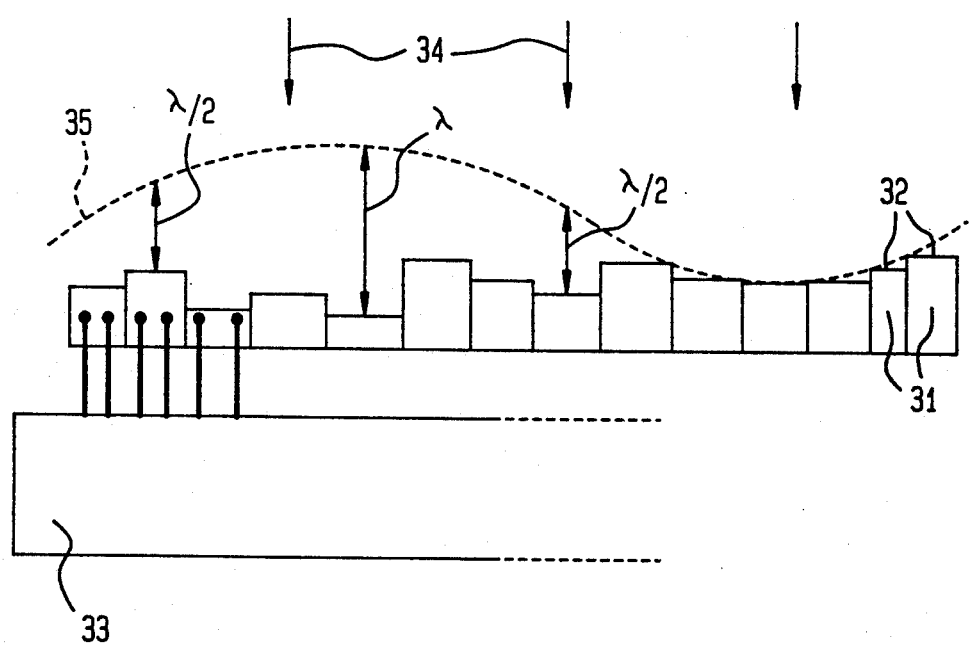
FIG. 3 is a schematic representation of an alternative further embodiment of a reflector subassembly for inclusion in a further preferred embodiment of the invention.

Illustrative of yet another preferred embodiment of a reflector assembly for pulse shaping, FIG. 3 shows an array of piezoelectric actuators 31 having reflective surfaces 32. Actuators 31 are electrically connected to electrical controller 33 so that, under electrical control, the combined surfaces 32 can serve as an electrically adjustable pulse-shaping mirror when spatially spread-out frequency components 34 of a signal are made incident on the array. (In this case, conveniently, any desired phase-shift function can be realized with physical displacements of surfaces 32 limited to half a wavelength. For example, for phase-shifting purposes, the array of actuators shown in FIG. 3 effectively produces a phase shift corresponding to the cubic shape 35.) This arrangement is particularly adaptable for the approximation of phase-shift functions of any order and any combination of orders, and it may be used equally for phase shifts which are not representable in terms of powers of frequency.

Figure 4:
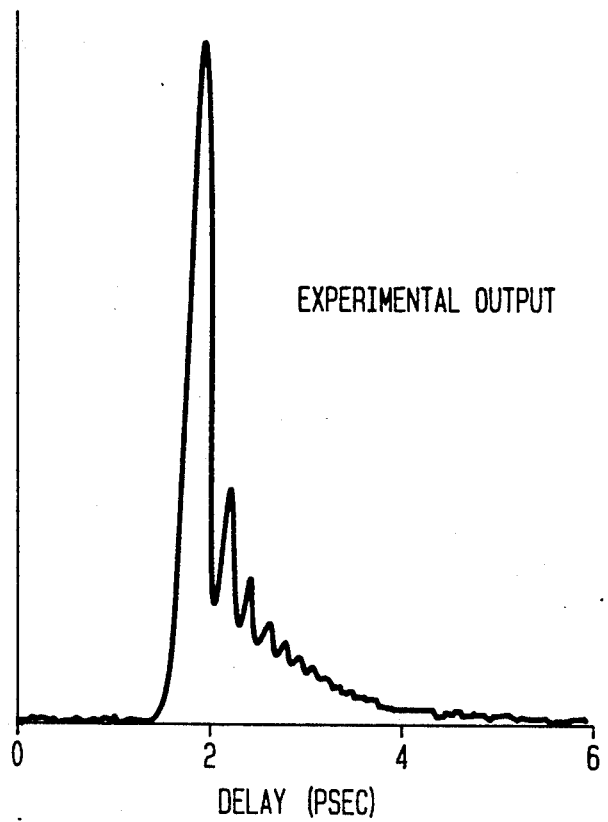
FIG. 4 is a graphic representation of an experimentally determined cross correlation between input and output signals to and from a preferred embodiment of the invention.
Figure 5:
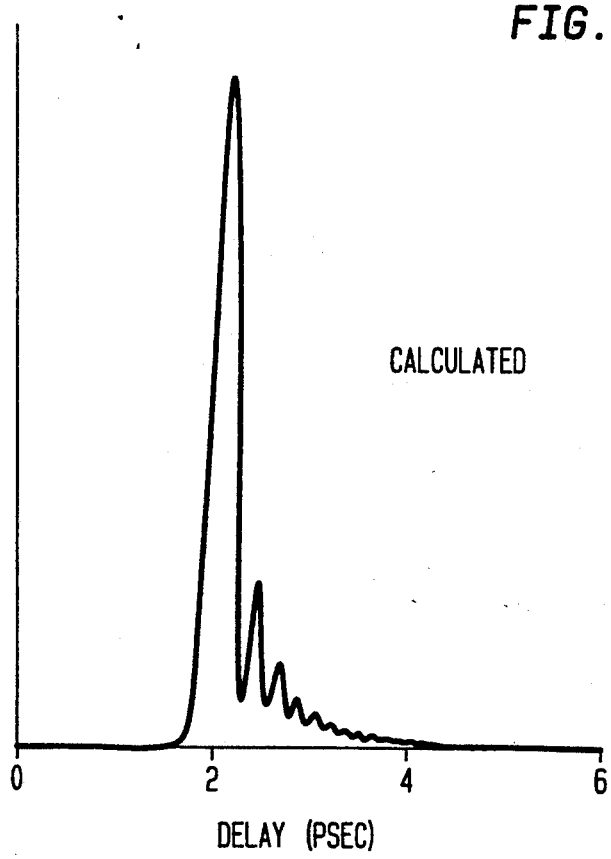
FIG. 5 is a graphic representation of a theoretically determined cross correlation between an input signal and a corresponding third-order deformed output signal.

For the sake of demonstration of the performance of an experimental device in accordance with FIG. 1, FIG. 4 and 5 show crosscorrelations as experimentally determined and as theoretically expected for third-order dispersion. The experiment was carried out with 100-femtosecond pulses of 1.54-micrometer radiation from an additive pulse mode locked sodium chloride laser; the physical dimensions of the phase-shift assembly were as described above. Close agreement between the two figures is readily appreciated.

Figure 6:
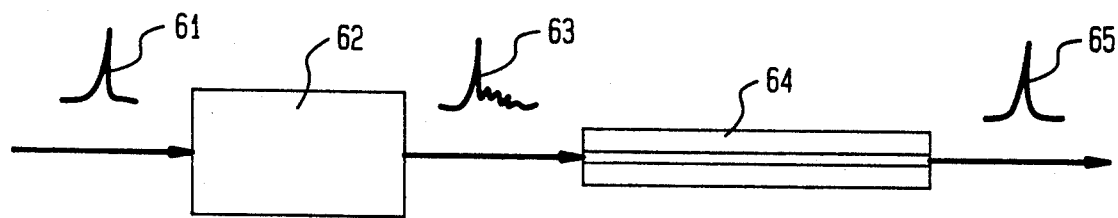
FIG. 6 is a schematic representation of a preferred embodiment of the invention, taking the form of a communications link.

FIG. 6 shows an input signal 61 to a preferred pulse-shaping device 62, a "pre-distorted" signal 63 produced by pulse-shaping device 62 for transmission over optical fiber 64, and a transmitted signal 65 whose shape matches that of input signal 61. Alternatively, a signal may undergo shaping after transmission; shaping before transmission is preferred, however, for the compensation of nonlinearities due to varying signal strength.

Figure 7:
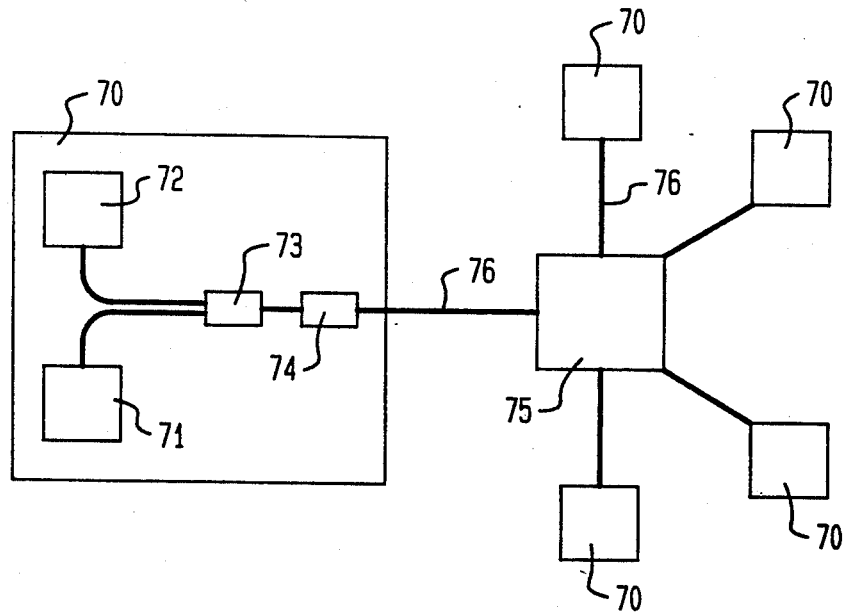
FIG. 7 is a schematic representation of an optical communications system comprising communications stations in accordance with a preferred embodiment of the invention.

Preferred pulse shaping involving the use of an optical reflector can be used in optical communications, e.g., to compensate for frequency dispersion in fiber-optical transmission. For example, as shown in FIG. 7, an optical communications system may include communications stations 70 (e.g., included in computer stations), each with receiver 71, transmitter 72, coupler 73, and pulse shaper 74; stations 70 are shown connected to star coupler 75 by means of optical fibers 76. In accordance with a preferred embodiment of the invention, pulse shapers 74 are adapted to compensate for frequency dispersion due to transmission of an optical signal over the one fiber 76 which connects a station 70 to star coupler 75.

In accordance with a further aspect of the invention, phase compensation and, more particularly, third-order phase compensation can be used to compress or reduce the width of a pulse after its generation in a gain medium, generation being understood to include laser generation as well as amplification of a pulse injected into a gain medium. Thus, preferred pulse compression is applicable, e.g., to semiconductor lasers and amplifiers; to rare-earth or transition metal doped crystal, bulk glass, or optical fiber lasers and amplifiers; to color-center systems such as sodium chloride lasers and amplifiers; and to gas lasers and amplifiers; dye lasers and amplifiers.

Figure 8:
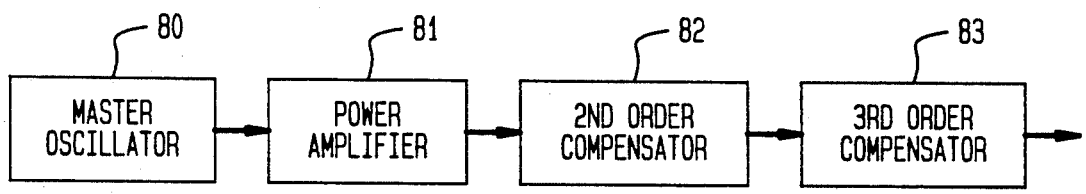
FIG. 8 is a schematic representation of an assembly comprising a laser and a pulse compressor in accordance with a preferred further embodiment of the invention.

An experimental set-up for demonstrating preferred pulse compression is schematically depicted in FIG. 8 which shows low-power master oscillator 80, semiconductor traveling-wave power amplifier 81, dual-grating second-order phase compensator 82, and third-order phase compensator 83, e.g., in accordance with FIG. 1. Arrows between components represent free-space or waveguide light paths.

Figure 9:
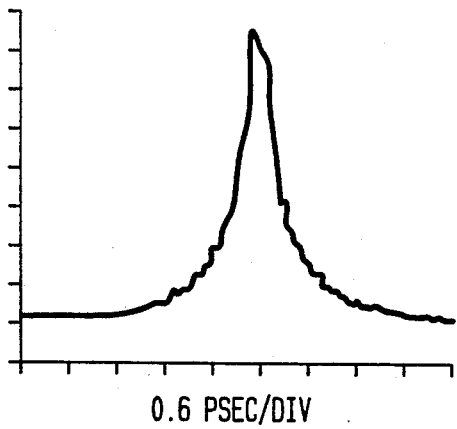
FIG. 9 is a graphic representation of an optical laser pulse prior to compression by a preferred method in accordance with an embodiment of the invention.
Figure 10:
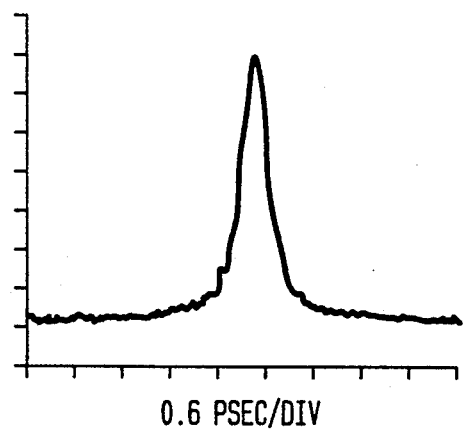
FIG. 10 is a graphic representation of an optical laser pulse after compression by a preferred method in accordance with an embodiment of the invention.

In an experiment, an autocorrelation analyzer was used to monitor optical pulse shape at the output of second order phase compensator 82, and compensator 82 was adjusted for optimal second-order pulse compression. The resulting pulses were then injected into third-order phase compensator 83, and compensator 83 was adjusted for optimal third-order pulse compression. Respective input and output pulses to and from the third-order phase compensator are shown in FIG. 9 and 10. As can be seen from FIG. 9, input-pulse duration is approximately 410 femtoseconds, and the pulse shape is characterized by large "wings" or "shoulders"; as can be seen from FIG. 10, output-pulse duration is approximately 290 femtoseconds, and there is no appearance of wings.

Third-order phase compensation as applied to an amplified laser pulse can be understood as representing a correction for quadratic chirp (and increased bandwidth) introduced by an integrating nonlinearity of the amplifying medium. Typically, such nonlinearity is most pronounced near saturation of the gain medium.

While, as described above, compression of an amplified laser pulse has been realized by means of a pulse shaper comprising a reflector element, such compression can be similarly realized by means of other third-order pulse-shaping devices or methods. For example, phase masks as disclosed in the above-identified patent to J. P. Heritage et al. can be readily adapted for third-order pulse compression.

We claim:

1. An optical pulse-shaping device comprising
spreader means for spatially spreading out frequency components included in an optical input signal,
mirror reflector means disposed for mirror reflecting spatially spread-out frequency components so as to impart a frequency-dependent phase shift to said spatially spread-out frequency components, and
adjusting means for adjusting the shape of said mirror reflector means.

2. The device of claim 1, said adjusting means comprising a micrometer pusher.

3. The device of claim 1, said adjusting means comprising a turntable, first and second supports for said mirror reflector means mounted on said turntable and third and fourth supports for said mirror reflector means not mounted on said turntable.

4. The device of claim 1, said adjusting means comprising a piezoelectric element.

5. An optical pulse-shaping device comprising:
spreader means for spatially spreading out frequency components included in an optical input signal;
reflector means disposed for reflecting spatially varying spread-out frequency components so as to impart a frequency-dependent phase shift to said spread out frequency components; and
adjusting means for adjusting the shape of said reflector means and being adapted to impart essentially cubic shape to said reflector means.

6. An optical pulse-shaping device, comprising:
spreader means for spatially spreading out frequency components included in an optical input signal, said spreader means comprising a grating and a lens, the distance between said grating and said lens being at least approximately equal to the focal length of said lens; and
metallically coated mirror reflector means disposed for mirror reflecting spatially spread-out frequency components so as to impart a frequency-dependent phase shift to said spatially spread-out frequency components.

7. The device of claim 6, the distance between said lens and said reflector means being at least approximately equal to the focal length of said lens.

8. A method for shaping an optical pulse, comprising the steps of:
spatially spreading out frequency components included in an input pulse;
adjusting the shape of a nonplanar metallically coated mirror surface of a body;
reflecting spread-out frequency components from said surface; and
combining reflected frequency components.

9. The method of claim 8, the shape of said surface being adjusted at least in part in response to an electrical signal.

10. An optical communications station comprising:
optical linking means and optical pulse-shaping means connected to said linking means, said optical pulse-shaping means comprising
spreader means for spatially spreading out frequency components included in an optical input signal, and
mirror reflector means disposed for reflecting spatially spread-out frequency components so as to impart a frequency-dependent phase shift to said spatially spread-out frequency components.

11. The optical communications station of claim 10, further comprising an optical receiver connected to said pulse-shaping means.

12. The optical communications station of claim 10, further comprising an optical transmitter connected to said pulse-shaping means.

13. An optical cubic corrector, comprising:
a reflector; and
means for introducing a deflection in said reflector having a component which varies essentially cubically along said reflector wherein said introducing means comprises
a first support supporting a first side of said reflector at a first point,
a second support supporting a second side of said reflector at a second point spaced apart along a lateral extent of said reflector from said first point, and
first pressure means for applying pressure to said second side of said reflector and disposed on a side of said first support opposite said second support, nd
second pressure means for applying pressure to said first side of said reflector and disposed on a side of said second support opposite said first support.

14. The corrector of claim 13, where said first and second pressure means torque said reflector about said supports.

* * * * *

UNITED STATES PATENT AND TRADEMARK OFFICE
CERTIFICATE OF CORRECTION

PATENT NO. : 5,166,818

DATED : November 24, 1992

INVENTOR(S) : Eugene W. Chase, Peter J. Delfyett, Jr., Jonathan P. Heritage, and Robert N. Thurston It is certified that error appears in the above-identified patent and that said Letters Patent is hereby corrected as shown below:

Column 3, line 23, "5" should read --15--.
Column 6, line 59, "nd" should read --and--.

Signed and Sealed this

Fifth Day of October, 1993

*Attest:*

BRUCE LEHMAN

*Attesting Officer*     *Commissioner of Patents and Trademarks*